March 13, 1945. A. Y. DODGE 2,371,227
FLUID CLUTCH
Filed Nov. 26, 1941

Inventor:
Adiel Y. Dodge,
By Dawson, Ooms and Booth,
Attorneys.

Patented Mar. 13, 1945

2,371,227

UNITED STATES PATENT OFFICE 2,371,227

FLUID CLUTCH

Adiel Y. Dodge, Rockford, Ill.

Application November 26, 1941, Serial No. 420,479

8 Claims. (Cl. 192—61)

This invention relates to fluid clutches and more particularly to positive displacement type fluid clutches controllable to connect or disconnect two shafts.

One of the objects of the invention is to provide a fluid clutch which comprises essentially a simple gear set and a simple control valve. A clutch of this character is inexpensive to construct, but is highly effective in action and can be connected or disconnected under full load.

Another object of the invention is to provide a fluid clutch including inter-acting fluid displacement parts coaxial with each other and with the driving and driven shafts.

Another object of the invention is to provide a fluid clutch in which the control valve is coaxial with the driving and driven shafts and is slidable axially thereof to control the clutch operation.

Still another object of the invention is to provide a fluid clutch of the planetary gear type in which inlet and outlet ports are formed in the sides of the planet carrier and communicate with the ends of the gear teeth. Preferably, the inlet and outlet ports are at opposite ends of the gears so that the fluid flows completely across the gears.

Another object of the invention is to provide a fluid clutch of the planetary gear type in which two inlet and two outlet ports are provided for each planet gear. This construction provides a double pumping action, increasing the capacity of the unit for a given size.

Another object of the invention is to provide a fluid clutch of the planetary gear type in which the different elements at different radii are made use of to reduce the fluid pressure required by reducing the tooth load.

Yet another object is to provide a fluid displacement clutch in which a minimum flow of fluid is maintained at all times for the purpose of lubrication.

Figure 1:
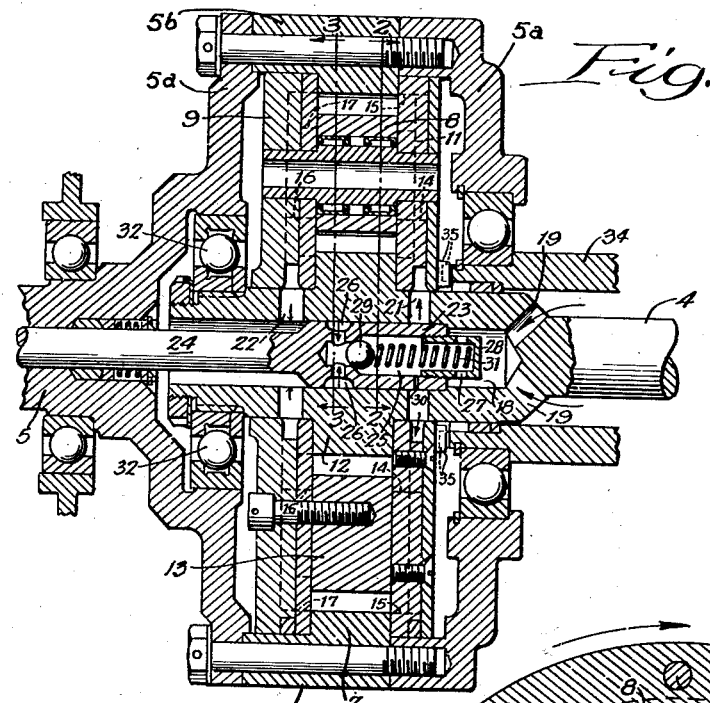

The above and other objects and advantages of the invention will be apparent from the following description when read in connection with the accompanying drawing, in which:

Figure 1 is an axial section of a clutch embodying the invention; and

Figure 2:
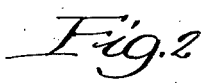
Figure 3:
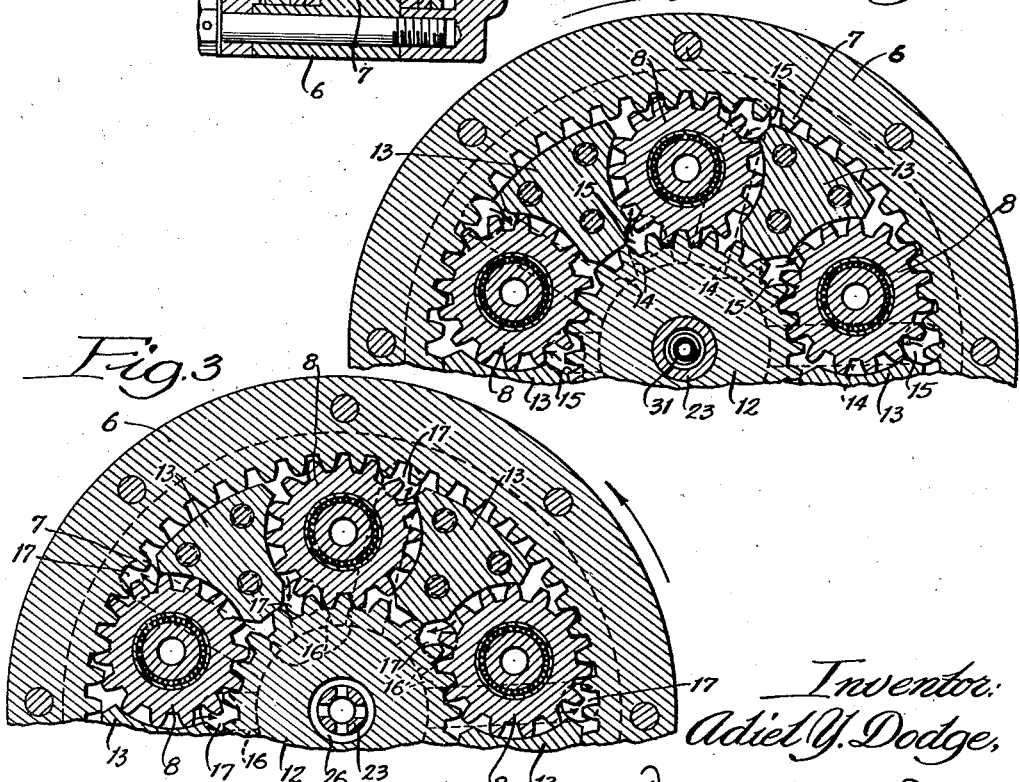

Figures 2 and 3 are sections on the lines 2—2 and 3—3 respectively of Figure 1.

The clutch shown in Figure 1 is adapted to connect two shafts, 4 and 5, one of which may be the driving and the other the driven shaft. The shaft 5 is connected to a casing which is made up of end plates 5a and a center ring 5b bolted together, the center ring being formed with an internal gear 7. The gear 7 meshes with a series of planet gears 8, rotatably carried between end plates 9 and 11, and the gears 8 in turn mesh with a sun gear 12 carried by the shaft 4.

The end plates 9 and 11 of the planet carrier fit tightly against the ends of the gear teeth to seal them against fluid leakage, and spacer members 13, as shown in Figures 2 and 3, are arranged between the gears and engage the ends of the teeth. The end plates 9 and 11 are rigidly secured together by bolts extending into the blocks 13 as shown to form a unitary gear carrier for the planet gears 8 which is rotatable relative to the ring gear 7 and sun gear 12. The gears thus form a positive displacement gear pump of a type known in the art.

Inlet passages for the gear pump are provided by radially extending channels 14 in the plate 11, opening at the radial inner edge of said plate, and terminating inlet ports 15 spaced substantially diametrically of the planet gears 8 at the points where the planet gears mesh with the ring gear 7 and sun gear 12. It will be noted that there are two inlet ports for each planet gear, so that each side of the gear operates as a separate gear pump.

Outlet ports for the pump are provided by similar radially extending channels 16 in the plate 9, opening at the radial inner edge of the plate and terminating in spaced outlet ports 17, spaced substantially diametrically of the planet gears 8. It will be noted that there are two outlet ports for each planet gear adjacent the points at which the planet gears engage the sun and ring gears, and offset with respect to the inlet ports.

To facilitate formation of the channels 14 and 16 the plates 9 and 11 are each preferably formed of two plates secured together with face grooves cut in one of the plates to form the channels.

Fluid is supplied to the unit through the inlet passages 14 from a central fluid chamber 18, formed in an extension of the shaft 4 and coaxial with the shafts. Fluid enters the chamber 18 through ports 19 and flows therefrom into the inlet passages through radial ports 21 in the shaft extension. Fluid leaving the pump through the outlet passages 16 flows back into the central chamber through similar radial ports 22 in the shaft extension.

Flow of fluid through the passages is controlled by a valve member 23, slidably fitting in the fluid chamber 18, which is preferably cylindrical and controlled by a valve rod 24 extending through the shaft 5. The valve member 23 fits tightly against the walls of the fluid chamber so as to control the ports 21 by its position. The valve is formed with a bore, as at 25, communicating at one end with ports 26 adapted to register with the ports 22, and at its opposite end through openings 27 in a closure plug 28 with the inlet end of the chamber 18. The passage 25 is normally closed by a valve 29, urged against its seat by a spring 31, and adapted to open under a predetermined pressure.

With the valve in the position shown in Figure 1, the shafts 4 and 5 are disconnected. In this position the inlet ports 21 are closed and the outlet ports 22 are open around the valve stem 24. Any fluid contained in the gear pump at this time will be forced out through the ports 22 and around the rod 24, and may be removed from the casing 6 in any desired manner. Thus the fluid passages between the gear teeth are empty and the several gear elements may rotate freely relative to each other.

In order that the parts may be properly lubricated during relative rotation under these conditions, the valve may be formed with means to provide a very small inlet of fluid to the pump. As shown, such means comprises a restricted port or orifice 30 leading from the bore 25 and communicating with the inlet passages 14 when the valve is in its closed position, as shown in Figure 1. The several passages 14 may intercommunicate at their inner ends so that all of them will receive fluid from port 30. This orifice admits a small amount of fluid from the bore 25 to the pump inlets and insures that the pump will be lubricated properly at all times.

When the valve 23 is shifted to the left, it opens the ports 21 and brings the ports 22 and 26 into register. At this time fluid is admitted to the gear pump and is forced therethrough by operation of the gears if there is any relative rotation between the shafts 4 and 5. The fluid is forced out through the outlet ports under pressure, and through the ports 22 and 26 into the bore 25. If the pressure is large enough to unseat the valve 29, the fluid flows through the bore 25 and by-passes back to the inlet ports through ports 27. It will be understood that the tension of spring 31 may be adjusted so that valve 29 will open at any desired pressure, this construction forming an overload release to prevent damage to the parts and to limit the amount of torque which can be transmitted by the clutch. Resistance to flow of fluid through the outlet ports tends to resist relative rotation of the gears, so that torque will be transmitted between the shafts 4 and 5, whereby one of the shafts may drive the other. In normal operation, when the load is less than that for which the valve 29 is adjusted, the fluid will prevent any substantial relative rotation between the gears, thereby locking the gear unit so that the shafts 4 and 5 and the gear carrier formed by parts 9, 11 and 13 will operate at substantially the same speed and in the same direction.

The clutch of the present invention is particularly adapted for use in connection with transmissions of the type illustrated in my copending applications, Serial No. 416,319, filed October 24, 1941, and Serial No. 419,883, filed November 21, 1941. In an environment such as that shown in these applications, it may be desirable to prevent overrunning of one of the shafts relative to the other, as for example, to prevent free-wheeling. For this purpose, the two shafts may be connected by a combined one-way clutch and bearing 32, which may be of the type more particularly disclosed and claimed in either my Patent No. 2,268,376 or my copending application, Serial No. 406,137 filed August 9, 1941. For example, if the shaft 4 is considered as a driving shaft, the clutch would be so arranged as to permit shaft 4 to turn forwardly faster than shaft 5, but to prevent shaft 5 from turning forwardly faster than shaft 4.

Under certain operating conditions, as for example, when heavy torque loads are to be transmitted at relatively low speeds, advantage may be taken of the different effective radii to reduce the tooth loads and the fluid pressure required to transmit a given torque. For this purpose, the gear carrier formed by plates 9 and 11 may be connected to a sleeve shaft 34 surrounding the shaft 4 and connected to the plate 11 by interengaging the teeth 35 to form a permanent driving connection. Drive is transmitted between the shaft 5 and the sleeve shaft 34 and the shaft 4 and sun gear 12 are permitted to idle.

With the unit connected in this manner, relative rotation between the shafts 5 and 34 with ring gear 7 turning relative to the carrier in the direction of the arrow in Figures 2 and 3 causes relatively rapid rotation of the gears about their own axes due to direct meshing of the ring gear and planet gears to cause increased speed of the sun gear, resulting in a high tooth speed and low tooth load. When the inlet valve is opened, the gears thus tend to pump larger volume of fluid at lower pressure, so that less fluid pressure on the valve and gear elements is produced to transmit a given torque than when shafts 4 and 5 are utilized as the load shafts.

While one embodiment of the invention has been shown and described in detail, it will be understood that this is illustrative only, and is not to be taken as a definition of the scope of the invention, reference being had for this purpose to the appended claims.

What is claimed is:

1. A fluid clutch comprising a rotatable planet carrier member, planet gears rotatably mounted on the carrier member, sun and ring gear members meshing with the planet gears, means closing the spaces between the gears, two of said members being connected respectively to driving and driven shafts, means forming inlet and outlet passages for fluid in the planet carrier opening at the sides of the gears, and valve means to control the flow of fluid through both said inlet and outlet passages.

2. A fluid clutch comprising a rotatable planet carrier member, planet gears rotatably mounted on the carrier member, sun and ring gear members meshing with the planet gears, means closing the spaces between the gears, two of said members being connected respectively to driving and driven shafts, means forming inlet and outlet passages for fluid in the planet carrier opening at the sides of the gears, a valve to control inlet of fluid through the inlet passage, means forming a by-pass between the outlet and inlet passages, and a pressure responsive valve normally closing the by-pass.

3. A fluid clutch comprising a rotatable planet carrier member, planet gears rotatably mounted on the carrier member, sun and ring gear members meshing with the planet gears, means closing the spaces between the gears, two of said members being connected respectively to the driving and driven shafts, said planet carrier having substantially radial passage in the sides thereof terminating in inlet and outlet openings at the sides of the gears, means forming a fluid chamber substantially coaxial with the clutch and radially inward of the gears, and valve means controlling communication of the chamber with the passages.

4. A fluid clutch comprising a rotatable planet carrier member, planet gears rotatably mounted on the carrier member, sun and ring gear members meshing with the planet gears, means closing the spaces between the gears, two of said members being connected respectively to driving and driven shafts, said planet carrier having substantially radial passage in the sides thereof terminating in inlet and outlet openings at the sides of the gears, means forming a fluid chamber coaxial with the clutch, a valve controlling communication of the chamber with the inlet passages, and a relief valve controlling communication of the chamber with the outlet passages.

5. A fluid clutch for connecting coaxial driving and driven shafts comprising a casing coaxial with the shafts, members in the casing interengaging to form a positive displacement pump, the casing being formed with radially extending inlet and outlet passages for the pump, means forming a fluid chamber coaxial with the shafts radially inward of the members, and a valve slidable axially in said chamber to control the flow of fluid through the passages.

6. A fluid clutch for connecting coaxial driving and driven shafts comprising a casing coaxial with the shafts, members in the casing interengaging to form a positive displacement pump, the casing being formed with radially extending inlet and outlet passages for the pump, means forming a fluid chamber coaxial with the shafts, a valve slidable axially in the chamber to control communication between the chamber and the inlet passages, said valve having an opening therethrough connecting the inlet and outlet passages, and a pressure responsive relief valve normally closing said opening.

7. A fluid clutch comprising relatively rotatable members forming a positive fluid displacement unit having inlet and outlet passages, a valve controlling said passages to close the inlet and open the outlet or to open the inlet and close the outlet, the valve having means associated therewith to provide a minimum opening for fluid to the inlet passage when the valve is in a position to close the inlet passage to provide a minimum amount of fluid through said members for lubrication.

8. A fluid clutch comprising a planetary gear set having means enclosing the gears to form a positive fluid displacement unit and having inlet and outlet passages, a valve controlling said passages to close the inlet and open the outlet or to open the inlet and close the outlet, the valve having means associated therewith to provide a minimum opening for fluid to the inlet passage when the valve is in a position to close the inlet passage to provide a minimum amount of fluid through the gears for lubrication.

ADIEL Y. DODGE.